UNITED STATES PATENT OFFICE.

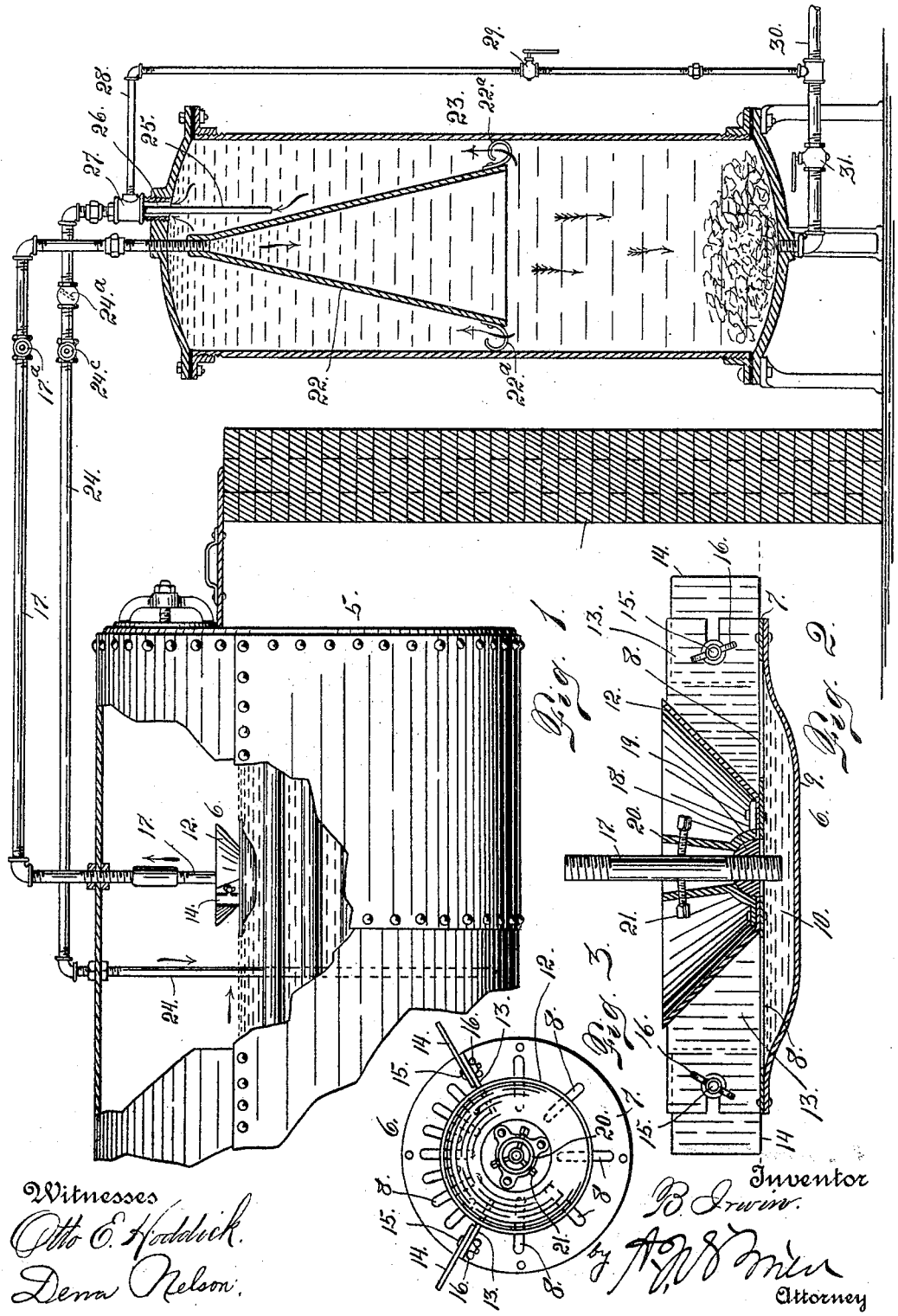

BRECKENRIDGE IRWIN, OF DENVER, COLORADO.

BOILER-CLEANER.

No. 804,194.      Specification of Letters Patent.      Patented Nov. 7, 1905.

Application filed April 10, 1905. Serial No. 254,765.

*To all whom it may concern:*

Be it known that I, BRECKENRIDGE IRWIN, a citizen of the United States, residing in the city and county of Denver and State of Colorado, have invented certain new and useful Improvements in Boiler-Cleaners; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in boiler-cleaners.

In my improvement the sediment or substance which otherwise would form the scale in the boiler is taken therefrom and delivered to a tank or precipitator located adjacent the boiler, the difference between the temperature in the boiler and the tank being sufficient to cause the sediment to be deposited in the tank. I employ a skimming device, so located as to catch the scale material as it rises to the top of the water in the boiler. A conduit leading from this skimmer communicates with the device located within the tank, whereby the scale material is delivered to the tank considerably below the top thereof. There is also a communication between the upper part of the tank and the lower part of the boiler, whereby the water in the tank is returned to the boiler and reused, the difference in temperature between the water in the top of the tank and that in the bottom of the boiler being sufficient to make this return automatic. Provision is also made for removing the sediment from the tank and also for removing the scum and oil.

Having briefly outlined my improved construction as well as the function it is intended to perform, I will proceed to describe the same in detail, reference being made to the accompanying drawings, in which is illustrated an embodiment thereof.

In the drawings, Figure 1 is a view illustrating my improved boiler-cleaning apparatus, the boiler being partly broken away and the tank shown in section. Fig. 2 is a sectional detail view of the skimmer shown on a larger scale. Fig. 3 is a top view of the same device shown on a smaller scale than in Fig. 2, but larger than in Fig. 1.

The same reference characters indicate the same parts in all the views.

Let the numeral 5 designate the boiler, which is partly broken away. It is assumed that the portion of the boiler shown is its rear extremity or that remote from the fire-box or source of heat. (Not shown.) Within this boiler and occupying a position at the top of the water therein is a device 6, adapted to take the dirt or scale material from the top of the water. This skimming device consists of a plate 7, provided with slots 8, and a bottom 9, surrounding the slotted portion of the plate and bent downwardly to form a receptacle 10. To the central portion of the plate 7 is attached a funnel 12. To this funnel are rigidly attached two wings 13, to which are attached extension members 14. The wings 13 are slotted, and the members 14 are connected therewith by screws 15, having thumb-nuts 16 for purposes of adjustment. In this way the length of the wings may be regulated at will. These wings are intended to direct the scale material, which has been carried to the upper part of the water in the boiler, into the skimmer-receptacle 10 by way of the slotted openings 8. Connected with this skimmer is an outlet-conduit 17, whose inner extremity is threaded to a semispherical part 18, engaging a bearing 19 of counterpart shape, the said bearing having an upwardly-projecting sleeve 20, which is outwardly flared as it extends upwardly. In this sleeve are threaded bolts 21 for the purpose of regulating the position of the skimmer, so that it shall occupy a horizontal position in the boiler or a correct position with reference to the water-level. This conduit 17 is connected with a depending inverted-funnel-shaped device 22, located in a tank 23 and extending downwardly therein a considerable distance. Another conduit 24 leads from the lower part of the boiler to the tank 23 and communicates with the upper portion of the water therein by a pipe 25, which projects somewhat below the surface, so that the scum contained in the tank cannot enter the same. This conduit 24 serves as a return communication between the tank 23 and the boiler.

The pipe 25 enters the top of the tank through an opening 26, considerably larger than the pipe and forming an outlet for the scum, oil, or impurities occupying the upper surface of the water. The pipe 25 also passes through a sleeve 27, having an opening of the same size as the opening 26. The top part of this sleeve forms a close fit around the pipe 25 where it joins the conduit 24. Connected with this sleeve outside of the pipe 25 is an outlet-conduit 28, provided with a valve 29. This conduit 28 leads downwardly to a conduit 30, provided with a valve 31. This conduit 30 leads from the bottom of the tank 23 and is utilized for carrying away the waste material taken from the boiler in the form of sediment from the bottom of the tank. The lighter scum or impurities, which float on the water in the tank, may pass through the conduit 28 to the pipe 30 or may have a separate discharge, as may be required.

From the foregoing description it will be understood that my object is to remove the dirt or scale material from the water in the boiler before the same is allowed to settle and form the scale. It will also be understood that this is automatically accomplished and, further, that the water which has escaped from the boiler in removing the impurities is automatically returned thereto.

When my improvement is in use, the tank 23 is located in convenient proximity to the boiler. In locating the skimming device 6 it is so placed as to take advantage of the circulation of the water in the boiler. For instance, the forward extremity of the boiler or the extremity nearest the fire-box will be hottest, causing an upward circulation from this end of the boiler toward its opposite or rear extremity, where it is coldest. This upward circulation carries the impurities or scale material to the top of the water in the boiler and carries the same backward for some distance. The skimmer device is so located as to catch these impurities while they are suspended at or near the upper part of the water in the boiler. The extension-wings of the skimming device may be made of any desired length, whereby the impurities from any desired area of the water-level may be directed into the receptacle 10 of the skimming device. It will be observed that the slots 8 of the skimmer are more numerous between the wings than outside thereof. However, the impurities which are not caught by the wings may be passed into the receptacle 10 through the slots 8 outside of the wings. After the impurities have been caught by the skimmer and directed into the receptacle 10 they pass out of the boiler through the conduit 17 and into the tank 23 by way of the device 22, whereby they are carried to a considerable depth in the tank. The heaviest of these impurities will form a sediment in the bottom of the tank 23, while the lighter impurities will rise to the top of the tank and pass out thereof through the opening 26 and thence into the conduit 28 and, finally, into the blow-off conduit 30, which is also connected with the bottom of the tank for removing the heavier material, as heretofore explained.

In beginning the operation the valve 31 of the blow-off pipe 30 should be opened. A valve $17^a$ in the pipe 17 should also be open to establish free communication between the boiler and the tank or precipitator 23. The pipe 24 is provided with a check-valve $24^a$ to prevent the water from traveling from the boiler to the precipitator through the pipe 24, but allowing the water to pass freely from the precipitator to the boiler when the valve $24^c$ of the pipe 24 is open. In beginning the operation the valve $24^c$ should also be closed. The water under the pressure in the boiler will then be forced into the precipitator until the latter is filled, in which event the valve 31 will be closed and the valve $24^c$ opened. Now as soon as the water in the precipitator cools below the temperature of the water in the boiler the boiler-pressure acting on the water in the precipitator will force the cooler water therein back into the boiler through the pipe 24, and this will continue as long as the water in the precipitator is cooler than the water in the boiler, since the column of water in the depending leg of the pipe is heavier than the water in the boiler of higher temperature. In this way a circulation is established from the boiler to the precipitator through the pipe 17 and from the precipitator to the boiler through the pipe 24.

The inverted-funnel-shaped device 22 is virtually an enlargement of the pipe 17 within the precipitator. By virtue of this enlargement the water carrying the scale material is protected from the upward current of the water indicated by the unfeathered arrows on opposite sides of the device 22, and by reason of this protection from agitation the scale material or sediment is caused to move downwardly in the direction of the feathered arrows and deposited in the bottom of the precipitator. This scale material may be blown out of the precipitator by opening the valve 31.

Attention is called to the fact that the device 22 is provided with springs $22^a$ at its lower extremity, whereby it is caused to fit quite closely within the tank or precipitator, and thus accurately centering it and holding it securely in place. Its vertical location in the precipitator may be regulated at will. It is well, however, to have its lower extremity located considerably below the top in order to facilitate the settling or precipitation of the sediment.

Having thus described my invention, what I claim is—

1. The combination with a boiler, of a tank located in suitable proximity to the boiler, a skimming device located in the boiler and occupying a position in the upper portion of the water of the boiler, a conduit leading from the skimming device to the tank and having an outlet at a considerable distance below the top of the tank, a ball-and-socket connection between the skimmer and the conduit, and a return-conduit communicating with the upper portion of the water in the tank and with the lower portion of the water in the boiler.

2. The combination with a boiler, of a skimming device located therein and having a bottom receptacle provided with an apertured cover, a tank located in suitable proximity to the boiler, a conduit leading from the said receptacle of the skimming device to the tank and discharging thereinto at a level considerably below the top of the tank, a return-conduit leading from the upper portion of the tank to the lower portion of the boiler, and outlets connected with the tank for removing the impurities both from the top and the bottom of the latter, substantially as described.

3. In a device of the class described, the combination with a boiler, of a tank located in suitable proximity to the boiler, a skimming device located in the boiler and consisting of a receptacle provided with wings for directing the floating impurities into the receptacle the latter being provided with an apertured cover, a conduit connected with the skimming device and communicating with the receptacle, the said conduit communicating with the tank at a considerable distance below the top of the latter, means for returning the water from the tank to the boiler, and means for removing the impurities from the tank, substantially as described.

4. The combination with a boiler, of a skimmer located therein and having a depressed bottom extending below the surface of the water, a plate covering the depressed portion and open to allow the sediment and the water to enter said portion, and an outlet-pipe connected with the skimmer and having an open extremity projecting below the surface of the liquid in the depressed portion or bottom of the skimming device.

5. The combination with a boiler and an outlet-pipe, of a skimmer located therein, a spherical segment connected with the skimmer extremity of the pipe, the skimmer having a socket for the segment and the extension above the socket larger than the pipe, and set-bolts threaded in said extension and engaging the pipe for purposes of adjustment.

6. The combination with a boiler and an outlet-pipe, of a skimmer located therein, a ball-and-socket connection between the pipe and the skimmer, and means for adjusting the skimmer with reference to the pipe.

7. The combination with a boiler and an outlet-pipe, of a skimmer having a bottom receptacle, an apertured covering for said receptacle, a ball-and-socket connection between the covering and the pipe, the latter having an open extremity projecting into the receptacle, a funnel-shaped member connected with the covering and surrounding the pipe connection, and radially-disposed wings mounted on the covering for the purpose set forth.

8. The combination with a boiler, of a tank or precipitator located in suitable proximity to the boiler, a skimming device located in the boiler and occupying a position in the upper portion of the water therein the said skimmer having a bottom receptacle and an apertured cover therefor, a conduit leading from the said receptacle of skimming device to the tank or precipitator and having a funnel-shaped outlet whose smaller extremity communicates with the pipe and whose larger extremity extends a considerable distance below the top of the precipitator.

9. The combination with a boiler, of a skimming device located therein, a precipitator located in suitable proximity to the boiler, a funnel-shaped device located therein and having its larger extremity lowermost and extending a considerable distance below the top of the precipitator, its larger extremity being provided with springs adapted to engage the inner walls of the precipitator whereby the device is properly centered, and a conduit leading from the skimming device to the smaller extremity of the funnel-shaped device.

In testimony whereof I affix my signature in presence of two witnesses.

BRECKENRIDGE IRWIN.

Witnesses:
  A. J. O'BRIEN,
  DENA NELSON.